United States Patent [19]

Urakami

[11] Patent Number: 4,860,400
[45] Date of Patent: Aug. 29, 1989

[54] DEVICE CAPABLE OF ADHERING TO A WALL SURFACE BY SUCTION AND TREATING IT

[76] Inventor: Fukashi Urakami, 5-21-204 Konandai 4-chome, Konan-ku, Yokohama, Japan

[21] Appl. No.: 57,087

[22] Filed: Jun. 3, 1987

Related U.S. Application Data

[62] Division of Ser. No. 825,305, Feb. 3, 1986, Pat. No. 4,688,289.

[30] Foreign Application Priority Data

Feb. 25, 1985 [JP] Japan .................................. 60-36009
Nov. 5, 1985 [JP] Japan ................................. 60-247667

[51] Int. Cl.⁴ .............................................. B63B 9/00
[52] U.S. Cl. ........................................ 15/98; 15/1.7; 15/385; 51/180; 51/273; 114/222
[58] Field of Search ......... 51/170 R, 170 T, 170 MT, 51/180, 273, 241 S, 429, 3, 177; 15/1.7, 98, 385; 114/222

[56] References Cited

U.S. PATENT DOCUMENTS

| | | | |
|---|---|---|---|
| 2,895,266 | 7/1959 | Statler | 51/180 |
| 3,495,358 | 2/1970 | Riedi | 51/273 |
| 4,095,378 | 6/1978 | Urakami | 51/429 |
| 4,355,487 | 10/1982 | Maier et al. | 51/273 |

FOREIGN PATENT DOCUMENTS 2141020 12/1984 United Kingdom ................ 114/222

Primary Examiner—Frederick R. Schmidt
Assistant Examiner—Robert A. Rose
Attorney, Agent, or Firm—Beveridge, DeGrandi and Weilacher

[57] ABSTRACT

A device capable of adhering to a wall surface by suction by the pressure of an ambient fluid and treating the wall surface, which comprises a pressure receiver member and a partition defining a pressure reduction zone in cooperation with the pressure receiver member and the wall surface.

In one aspect, the partition has a sealing function of preventing inflow of a large amount of an outside fluid into the pressure reduction zone, and a treating function of treating the wall surface by being moved in a required manner.

In another aspect, the partition has the above sealing function, and a travelling function of moving the device, by being rotated about an axis of rotation slightly inclined to an axis which is substantially perpendicular to the wall surface.

17 Claims, 12 Drawing Sheets

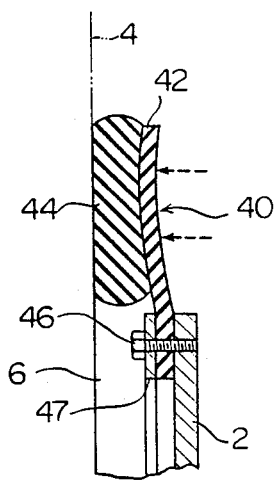
Fig. 5-A
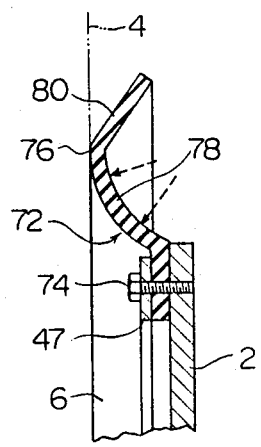
Fig. 5-B
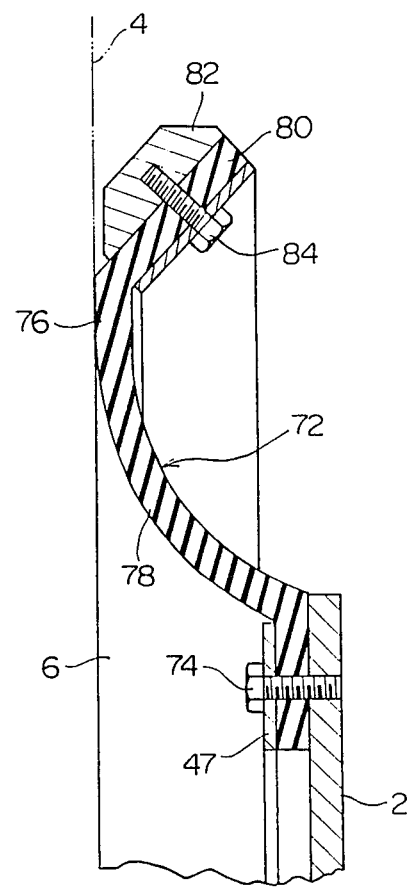
Fig. 6

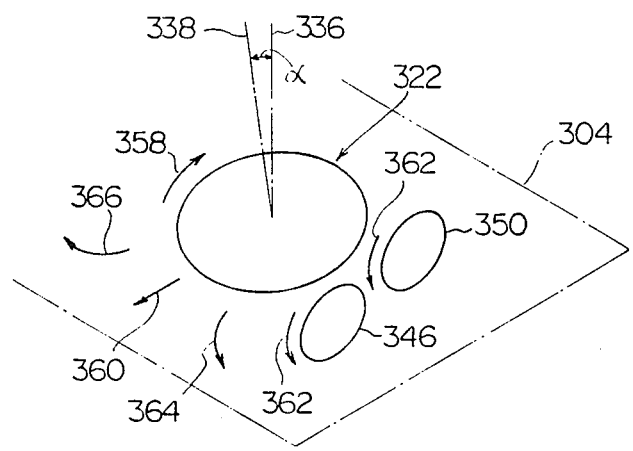
Fig. 13-A
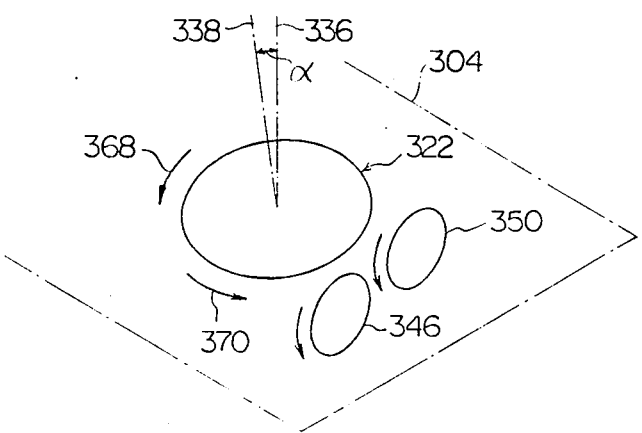
Fig. 13-B

ID APABLE OF ADHERING TO A WALL
SURFACE BY SUCTION AND TREATING IT

This application is a division of application Ser. No. 825,305, filed Feb. 3, 1986 now U.S. Pat. No. 4,688,289.

BACKGROUND OF THE INVENTION

1. Field of the Invention

This invention relates to a device capable of suction-adhering to a wall surface by the pressure of an ambient fluid such as air or water and treating the wall surface. More specifically, it relates, although not exclusively, to a device capable of suction-adhering to a wall surface of a ship or a building and cleaning or otherwise treating the wall surface.

2. Description of the Prior Art

A device for performing work such as cleaning of an outside wall surface of a ship, an outside wall surface of an oil reservoir tank, an outside surface of a tall building, etc. is proposed in U. S. Pat. No. 4,095,378 to F. Urakami which comprises a pressure receiver housing, a plurality of wheels provided in the pressure receiver housing for contact with the wall surface, a partition having one end connected to the pressure receiver housing and adapted to define a substantially fluid-tight pressure reduction zone in cooperation with the pressure receiver housing and the wall surface upon partial contact with the wall surface, means for discharging fluid from the pressure reduction zone to create a vacuum within the pressure reduction zone, and working means provided in the pressure receiver housing.

In this conventional device, a vacuum is formed within the pressure reduction zone by vacuum-producing means, and a part of the partition is contacted fluid-tight with the wall surface by the fluid pressure acting on the partition owing to a difference in fluid pressure between the inside and outside of the pressure reduction zone. In the meanwhile, the fluid pressure acting on the pressure receiver housing owing to a difference in fluid pressure between the inside and outside of the pressure reduction zone is transmitted to the wall surface via the wheels. As a result, the device is caused to adhere by suction to the wall surface. The device suction-adhering to the wall surface is adapted to move along the wall surface by driving the wheels. Hence, the above-described device can adhere to the wall surface by suction and can move along it. By the working means provided in it, it can perform the desired work such as cleaning of the wall surface.

In the known device, means for causing the device to adhere by suction to the wall surface and move along it and treating means for performing treatments such as cleaning of the wall surface are constructed independently from each other. This structure increases the size and weight of the entire device and leads to a high cost of production.

SUMMARY OF THE INVENTION

It is an object of this invention to provide a novel and excellent device which can surely adhere to a wall surface by suction and treat the wall surface in a required manner by a simple construction, and which is conducive to a reduction in size and the cost of production.

Another object of this invention is to provide a novel and excellent device capable of suction-adhering to a wall surface and uniformly treating the wall surface while moving along it.

Other objects of this invention will become apparent from the following description.

According to one aspect of the invention, there is provided a device capable of adhering to a wall surface by suction by the pressure of an ambient fluid and treating the wall surface, said device comprising a pressure receiver member made of a rigid or a semi-rigid material, a partition provided on that side of the pressure receiver member which faces the wall surface, the partition being rotatable with respect to the pressure receiver member about an axis of rotation slightly inclined to an axis substantially perpendicular to the wall surface, and a part of the partition being adapted to make contact with the wall surface to define a pressure reduction zone in cooperation with the pressure receiver member and the wall surface, means for creating a vacuum within the pressure reduction zone by discharging the fluid from the pressure reduction zone, and a driving source mounted on the pressure receiver member for rotating the partition with respect to the pressure receiver member;

wherein the device is caused to adhere to the wall surface by suction owing to a difference in fluid pressure between the inside and outside of the pressure reduction zone, and the device is moved by rotating the partition by the driving source.

According to yet another aspect of the invention, there is provided a device capable of adhering to a wall surface by suction by the pressure of an ambient fluid and treating the wall surface, said device comprising a main body, a pressure receiver member made of a rigid or semi-rigid material and mounted on the main body for free movement about an axis of rotation slightly inclined to an axis substantially perpendicular to the wall surface, a partition provided on that side of the pressure receiver member which faces the wall surface, one end portion of the partition being connected to the pressure receiver member, and a part of the partition being adapted to make contact with the wall surface to define a pressure reduction zone in cooperation with the pressure receiver member and the wall surface, means for creating a vacuum within the pressure reduction zone by discharging the fluid from the pressure reduction zone, and a driving source mounted on the main body for rotating the pressure receiver member with respect to the main body;

wherein the device is caused to adhere by suction to the wall surface owing to a difference in fluid pressure between the inside and outside of the pressure reduction zone, and the device is moved by rotating the partition by the driving source.

In these devices of the invention, a part of the partition is adapted to make contact with the wall surface to define the pressure reduction zone in cooperation with the pressure receiver member and the wall surface. The partition or the pressure receiver member to which the partition is connected is mounted rotatably about an axis of rotation slightly inclined to an axis substantially perpendicular to the wall surface with respect to the pressure receiver member or the main body of the device. Accordingly, the partition has a sealing function of preventing an outside fluid from flowing in a large amount into the pressure reduction zone, and a travelling function of moving the device by being rotated with respect to the pressure receiver member or the main body of the device. The partition can therefore serve also as part of travelling means for moving the device, and the simplification and size reduction in the device can be achieved.

In embodiments of these devices, the partition has a treating function of treating the wall surface in addition to the sealing function and the travelling function. As a result, the device do not separately require means for treating the wall surface. Thus, the present invention achieves further simplification and size reduction in devices capable of moving along a wall surface and treating it.

BRIEF DESCRIPTION OF THE DRAWINGS

FIG. 5A is a sectional view showing the peripheral edge portion of a pressure receiver member in the device of FIG. 1 on an enlarged scale;

FIG. 5-B is a sectional view showing the peripheral edge portion of a pressure receiving member in the device equipped with a modified partition on an enlarged scale;

FIG. 6 a sectional view showing the peripheral edge portion of a pressure receiving member in the device equipped with another modified partition on an enlarged scale;

FIGS. 13-A and 13-B are simplified views for illustrating the travelling directions of the device shown in FIG. 10;

DETAILED DESCRIPTION OF PREFERRED EMBODIMENTS

Preferred embodiments of the device constructed in accordance with this invention will be described in detail with reference to the accompanying drawings.

Figure 1:
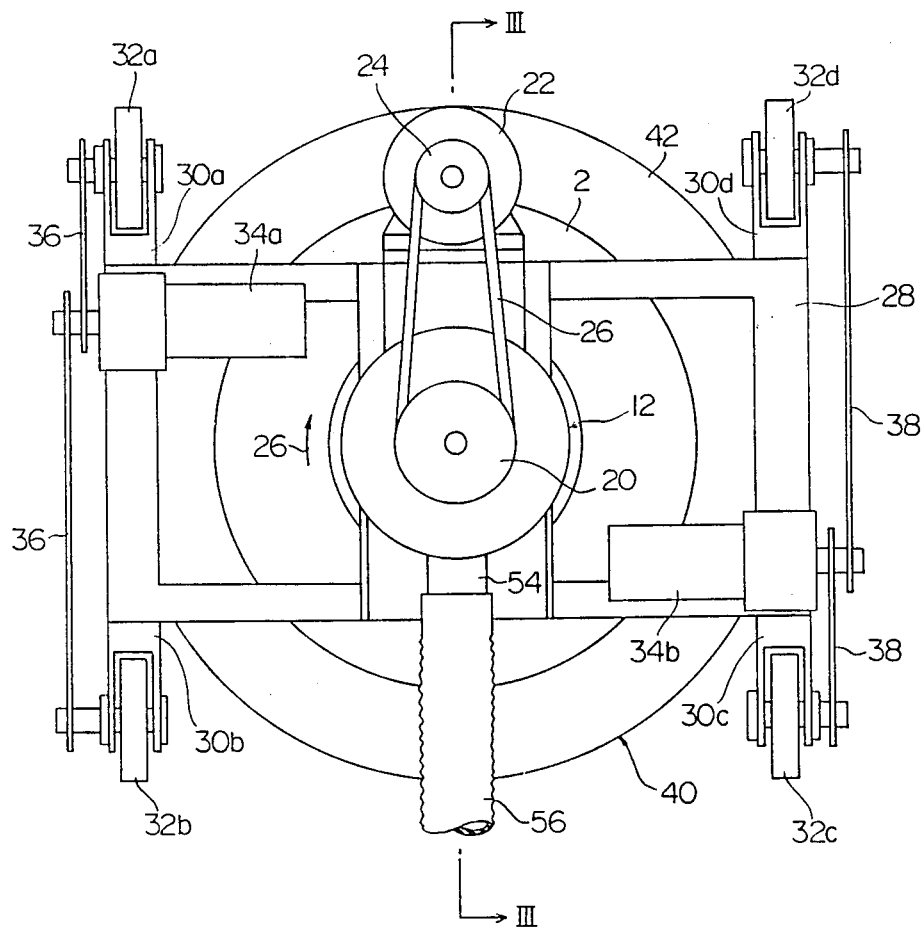
FIG. 1 is a top plan view showing a first embodiment of the device constructed in accordance with this invention.
Figure 2:
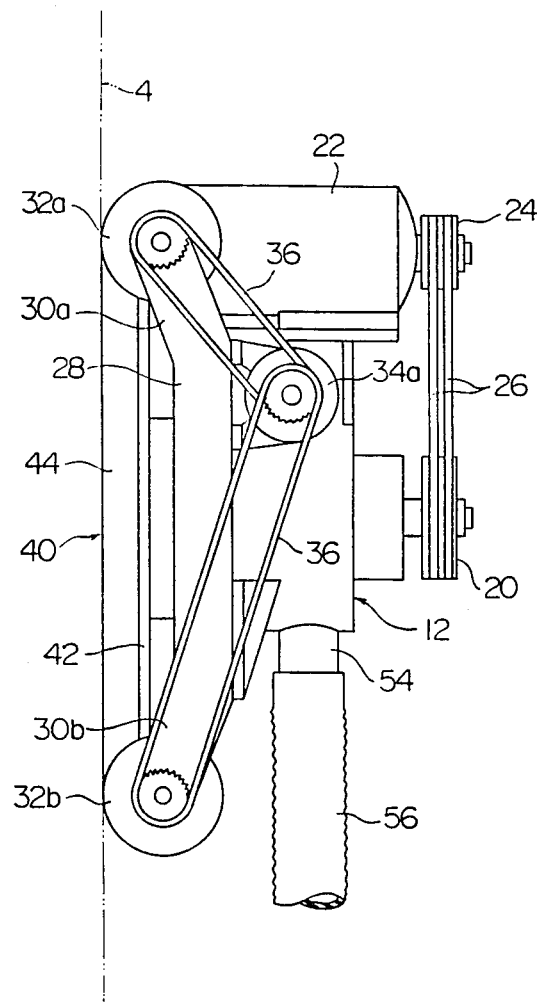
FIG. 2 is a side elevation of the device shown in FIG. 1.
Figure 3:
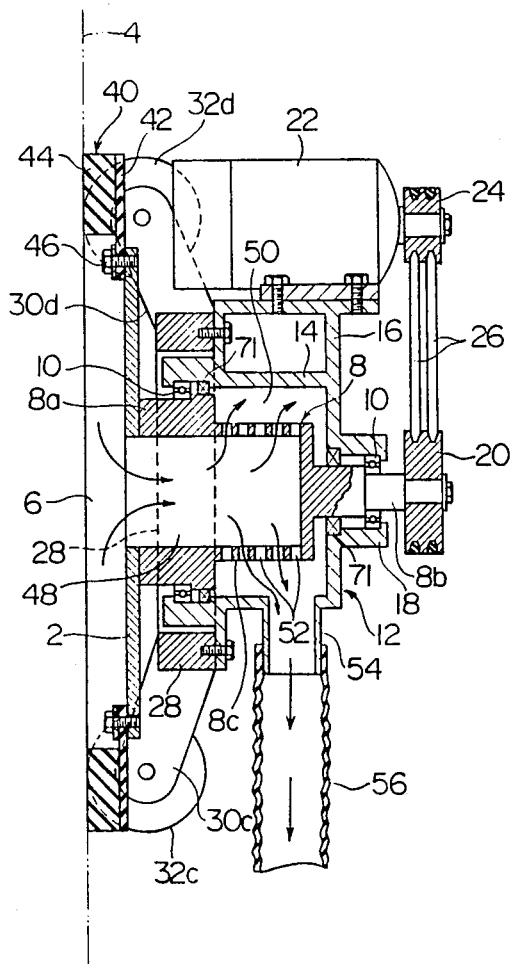
FIG. 3 is a sectional view taken along line III—III of FIG. 1.

With reference mainly to FIGS. 1 to 3, a first embodiment of the device of this invention will be described.

The apparatus of the first embodiment shown in FIGS. 1 to 3 includes a pressure receiver member 2 made of a rigid or semirigid material such as a steel plate. The pressure receiver member 2 may be of any suitable shape which defines a pressure reduction zone 6 in cooperation with a partition and a wall surface to which the device adheres by suction. In the illustrated embodiment, the pressure receiver member 2 is of a generally circular shape. A shaft member 8 is fixed to a central part of the outside surface of the pressure receiver member 2 (that surface of the pressure receiver member 2 which is opposite to the surface facing the wall surface 4). It has a large-diameter portion 8a extending substantially perpendicularly outwardly and a small-diameter portion 8b extending further outwardly from the large-diameter portion. The large-diameter portion 8a and the small-diameter portion 8b of the shaft member 8 are each rotatably mounted on a main body 12 of the device through bearings 10. Specifically, the large-diameter portion 8a is rotatably supported on a cylindrical wall 14 of the main body 12 through the bearing 10, and the small-diameter portion 8b is rotatably supported on a cylindrical projecting wall 18 extending outwardly from an upper wall 16 of the main body 12 through the bearing 10. It will be understood from FIG. 3 that the bearings 10 used are those for thrust loads and radial loads. The free end of the shaft member 8 projects outwardly through the cylindrical projecting wall 18, and a pulley 20 having two V-shaped grooves is mounted on the free projecting end of the shaft member 8. A driving source 22 such as an electric motor is mounted on the main body 12 of the device. A pulley 24 having two V-shaped grooves is mounted on the output terminal of the driving source 22 as in the shaft member 8. Two belts 26 are wrapped between the pulleys 20 and 24. Hence, when the driving source 22 is rotated, the shaft member 8 is rotated in a direction of an arrow 26 (FIG. 1) via the belts 26, and the pressure receiver member 2, in turn, is rotated about the central axis of the shaft member 8, i.e. an axis of rotation extending substantially perpendicularly to the wall surface 4.

A rigid frame member 28 is fixed to the main body 12 of the device, and wheels 32a, 32b, 32c and 32d are rotatably mounted respectively on four leg portions 30a, 30b 30c and 30d of the frame member 28 (FIG. 1). As will be described in detail hereinafter, in this embodiment, the wheels 32a, 32b, 32c and 32d are urged against, and kept in contact with, the wall surface 4 by the pressure of an ambient fluid acting on the pressure receiver member 2. Two electric motors 34a and 34b constituting a driving source are attached to the frame member 28. Preferably, the electric motors 34a and 34b can rotate in two directions. The electric motor 34a is drivingly connected to the wheels 32a and 32b via a suitable power transmission means such as a chain 36 and a sprocket to rotate the wheels 32a and 32b. Likewise, the electric motor 34b is drivingly connected to the wheels 32c and 32d via a suitable power transmission means such as a chain 38 and a sprocket to rotate the wheels 32c and 32d. In the illustrated embodiment, four wheels are used. Alternatively, three or five or more wheels may be used. Furthermore, instead of the wheels, two or more endless tracks known per se may be used.

A partition 40 is disposed on the peripheral edge portion of the inside surface of the pressure receiver member 2 (that surface of the pressure receiver member 2 which faces the wall surface 4). As can be easily seen from FIG. 3, one end of the partition 40 is connected to the pressure receiver member 2, and a part of the partition 40 makes contact with the wall surface 4. In cooperation with the pressure receiver member 2 and the wall surface 4, the partition 40 defines the pressure reduction zone 6. Preferably, at least that part of the partition 40 which makes contact with the wall surface 4 can be displaced by a relatively small force toward and away from the wall surface 4 with respect to the pressure receiver member 2. Accordingly, in the first embodiment, the partition 40 is constructed of a relatively thin plate-like annular member 42 and a relatively thick annular member 44 fixed to the peripheral part of the annular member 42, as shown in FIG. 3. One end portion of the partition 40, i.e., the inner circumferential portion of the annular member 42, is connected to the peripheral edge part of the inner surface of the pressure receiver member 2 by a suitable means such as a bolt 46, and the inner circumferential part of the annular member 42 is pressed against the pressure receiver member 2 by a pressing plate 47. The annular member 42 is formed preferably of a flexible material such as a polyurethane rubber. This enables the inner circumferential portion of the annular member 42, i.e., that portion of the annular member 42 which is connected to the pressure receiver member 2, to be displaced by a relatively small force toward and away from the wall surface 4. In the illustrated embodiment, the annular member 44 is also made of a flexible material such as a polyurethane rubber.

Figure 4:
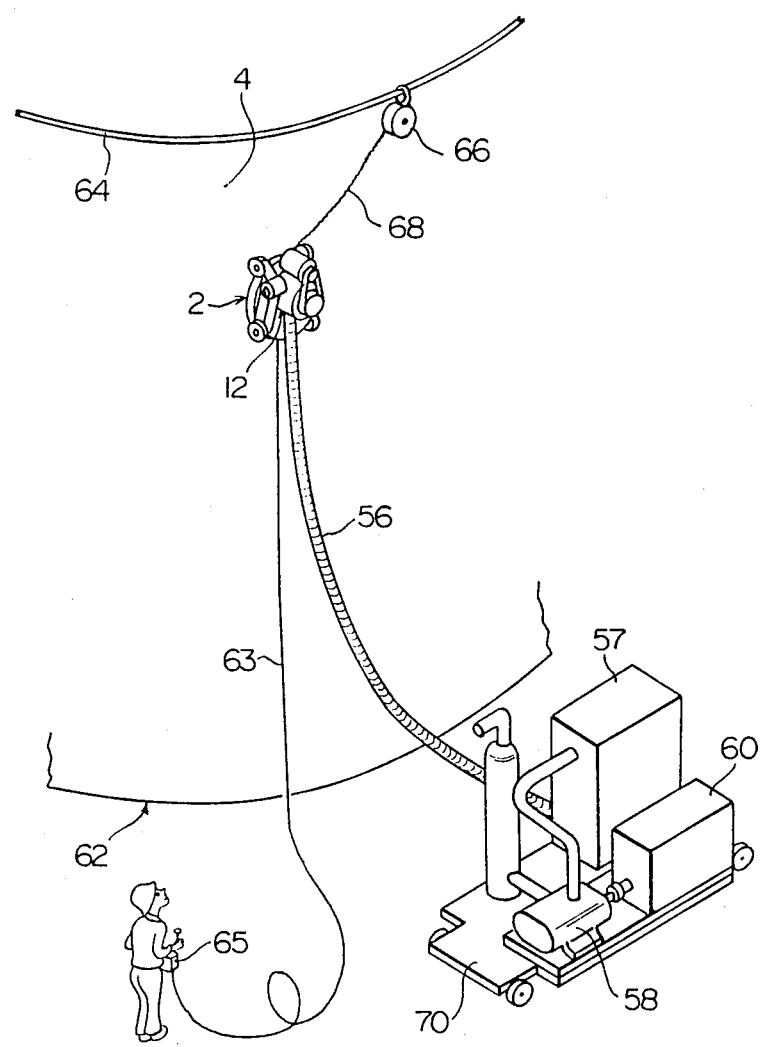
FIG. 4 is a rough view showing the state in which a job of treating a wall surface is done by using the device of FIG. 1.

The pressure reduction zone 6 defined by the pressure receiver member 2, the partition 40 and the wall surface 4 is caused to communicate with means for forming a vacuum within the pressure reduction zone 6, such as a vacuum pump or a liquid pump. With reference to FIGS. 3 and 4, an axially extending hollow portion 48 is formed in the large-diameter portion 8a of the shaft member 8. The hollow portion 48 is caused to communicate with the pressure reduction zone 6 through an opening formed in the pressure receiver member 2. A stepped portion 8c is formed in the large-diameter portion 8a of the shaft member 8 (more specifically between the small diameter portion 8b and that part of the large-diameter portion 8a which is supported on the bearing 10). An annular space 50 is defined between the peripheral surface of the stepped portion 8c and the inner circumferential surface of the cylindrical wall 14 of the main body 12 of the device. The hollow portion 48 communicates with the annular space 50 through a plurality of holes 52 formed in a stepped portion 8c. A connecting portion 54 is formed in the cylindrical wall 14 as an integral unit. One end portion of a flexible hose 56 is connected to the connecting portion 54, and its other end is connected to an exhaust means such as a vacuum pump 58 via a separator 57. The vacuum pump 58 is operated, for example, by an engine 60. Desirably, a vacuum breaker (not shown) is provided in order prevent the vacuum produced within the pressure reduction zone 6 from attaining a degree of vacuum above a certain limit.

The device described above can be applied, for example, to a job of treating the outside wall surface 4 of an oil reservoir tank 62 as shown in FIG. 4. In FIG. 4, the illustrated device can be operated by a remote control method, and the driving source 22 and the electric motors 34a and 34b provided in the device can be operated and controlled when the operator manipulates a control box 65 connected to the device through a cable 63. A rope 64 is stretched alongside the wall surface and a known fall-preventing member 66 is secured to the rope 64. The fall-preventing member 66 is equipped with a wind-up drum (not shown), and an output end of the rope 68 wound upon the wind-up drum is connected to the frame member 28, for example, of the illustrated device. On the other hand, the separator 57, the vacuum pump 58 and the engine 60 are secured to a track 70 movable over the ground.

The operation and advantages of the illustrated device will be described mainly with reference to FIG. 3. For example, when the vacuum pump 58 is operated in the state shown in FIG. 4, a fluid (air when the device is used in the open atmosphere as in FIG. 4) within the pressure reduction zone 6 is discharged out of the zone 6 via the hollow portion 48 of the shaft member 8, the holes 52 formed in the shaft member 8, the annular space 50 and the flexible hose 56, whereby a vacuum is created within the pressure reduction zone 6. Preferably, at this time, a seal member 71 is mounted, for example, as shown in FIG. 3 in order to prevent the inflow of a fluid from outside into the annular space 50.

One end portion of the partition 40 is connected to the pressure receiver member 2 so that it can be displaced toward and away from the wall surface 4 by a relatively small force. On the other hand, the wheels 32a, 32b, 32c and 32d are provided in the pressure receiver member 2 through the rigid frame 28 substantially all. When a vacuum is created within the pressure reduction zone 6, substantially all the pressure of an ambient fluid acting on the pressure receiver member 2 owing to a difference in fluid pressure between the inside and outside of the pressure reduction zone 6 is transmitted to the wheels 32a, 32b, 32c and 32d from the pressure receiver member 2 via the bearings 10, the main body 12 of the device and the rigid frame 28, and further transmitted to the wall surface via these wheels, as can be easily seen from FIG. 3. As a result, the device is caused to adhere to the wall surface 4 by suction.

On the other hand, the pressure of an ambient fluid acting on the partition 40, particularly on the annular member 42, owing to a difference in fluid pressure between the inside and outside of the pressure reduction zone 6 acts so as to bias the partition 40, i.e. the annular member 42 and the annular member 44, toward the wall surface 4 and contact the annular member 44 with the wall surface 4, as shown by a broken arrow in FIG. 5-A. Consequently, the partition 40 (the annular member 44 in the embodiment) makes contact with the wall surface 4, and the contacting pressure makes possible a job of treating the wall surface 4. The pressure reduction zone 6 defined by the partition 40 is substantially fluid tight, or may have some air permeability.

When the driving source 22 is energized while the device adheres to the wall surface 4 in this way, the pressure receiver member 2 is rotated in the direction of arrow 26 (FIG. 1) via the pulley 24, the belts 26, the pulley 20 and the shaft member 8. As a result, the partition 40 is also rotated in the direction of arrow 26 as a unit with the pressure receiver member 2, and by the rotation of the partition 40, the wall surface 4 can be cleaned. In the suction-adhering state, a part of the partition 40, i.e. the annular member 44, is kept in contact with the wall surface 4. Thus, when the partition 40 is rotated by the energization of the driving source 22, the annular member 44 moves while acting on the wall surface 4 and thereby cleans the surface 4. In the illustrated embodiment, the one end portion of the partition 40 is connected to the pressure receiver member 2, so that it can be displaced toward and away from the wall surface 4 by a relatively small force, and the partition 40 is brought into contact with the wall surface 4 by the pressure of an ambient fluid acting on it. Hence, the pressure of contact between the partition 40 and the wall surface 4, namely the pressure of the cleaning operation, can be maintained constant and the wall surface can be cleaned substantially uniformly. The pressure of contact between the partition 40 and the wall surface 4 is affected by the pressure of the fluid acting on the partition 40 substantially irrespective of the fluid pressure acting on the pressure receiver member 2 owing to a difference in fluid pressure between the inside and outside of the pressure reduction zone 6, and can be easily changed by changing the pressure receiving area of the partition 40. In this regard, a suction force required for the adherence of the device to the wall surface 4 can be obtained by prescribing the pressure-receiving area of the pressure receiver member 2 at a suitable value.

Since in the cleaning operation, some gap exists between the partition 40 and the wall surface 4 by the rough nature of the wall surface 4, the fluid from outside flows at high speed into the pressure reduction zone 6 via the gap between the partition 40 and the wall surface 4. As a result, dust and dirt generated during cleaning are carried to the inside of the pressure reduction zone 6 on the high-speed fluid and is therefore prevented from scattering out of the device. The dust and dirt carried into the pressure reduction zone 6 is transferred to the separator 57 through the flexible hose 56 together with the fluid within the pressure reduction zone 6 by the action of the vacuum pump 58 and thus recovered by the separator 57.

The partition 40 may be formed of, for example, a brush-like member or a porous material. Alternatively, a plurality of small protrusions may be provided on that surface of the partition 40 which makes contact with the wall surface 4, and this can also increase the cleaning efficiency during the cleaning operation.

When the wall surface is to be cleaned, a partition 72 illustrated in FIG. 5-B may be conveniently used instead of the partition 40 shown in FIGS. 1 to 4 and 5-A.

In FIG. 5-B showing the peripheral edge portion of the pressure receiver member 2, the partition 72 is formed of an annular member made of a flexible material such as a polyurethane rubber. As is clear from FIG. 5-B, the partition 72 includes a main portion 78 extending outwardly toward the wall surface 4 from its one end connected to the peripheral edge portion of the pressure receiver member 2 by a suitable means such as a bolt 74 and having a free end portion 76 adapted to make contact with the wall surface 4, and an extension 80 extending outwardly from the free end portion 76 away from the wall surface 4. Since the partition 72 itself is formed of a flexible material, the free end 76 of the main portion 78 can be displaced toward and away from the wall surface 4 by a relatively small force because of the flexibility of the main portion 78.

Accordingly, when the partition 72 shown in FIG. 5-B partly on an enlarged scale is used instead of the partition 40 shown in FIG. 5-A partly on an enlarged scale, a similar effect can be produced because that portion of the partition 72 which makes contact with the wall surface 4 (i.e., the free end 76 of the main portion 78) can be displaced toward and away from the wall surface 4 by a relatively small force. Specifically, by the fluid pressure acting on the partition 72 owing to a difference in fluid pressure between the inside and outside of the pressure reduction zone 6, the free end portion 76 of the main portion 78 is brought into contact with the wall surface 4. In the meantime, the fluid pressure acting on the pressure receiver member 2 owing to a difference in fluid pressure between the inside and outside of the pressure reduction zone 6 is transmitted to the wheels 32a, 32b, 32c and 32d via the main body 12 of the device and the frame member 28 and further to the wall surface 4 via these wheels 32a to 32d. As a result, the device is caused to adhere to the wall surface 4 by suction.

Since the partition 72 has the extension 80 extending outwardly from the free end portion 76 to be contacted with the wall surface 4 and in a direction away from the wall surface 4, the use of the partition 72 has the advantage that even when protrusions exist on the wall surface 4, the partition 72 does not warp inwardly during the travelling of the device to be described, and can easily ride over the protrusions by the action of the extension 80.

When it is desired to remove solid matter adhering to the wall surface 4, a blade 82 may be attached as shown in FIG. 6 to the partition 72 shown in FIG. 5-B. In FIG. 6, the blade 82 which can be formed from a metallic material is attached to the partition 72, more specifically to that surface of the extension 80 which faces the wall surface 4, by a suitable means such as a bolt 84. Accordingly, the blade 82 rotates as a unit with the partition 72.

When the partition 72 equipped with the blade 82 is used, the rotating blade 82 acts on the solid matter adhering to the wall surface 4, and during the cleaning of the wall surface 4 by the partition 72, the solid matter can be surely removed by the blade 82.

The partition 72 shown in FIG. 6 can be conveniently used for cleaning the outside wall surface of a ship, and solid matter such as barnacles adhering to the outside wall surface of the ship can be easily removed by the action of the rotating blade 82.

Again with reference to FIGS. 1 to 3, the illustrated device can be caused to travel in a required manner while adhering to the wall surface by operating the electric motors 34a and 34b. For example, when the wheels 32a and 32b and the wheels 32c and 32d are rotated in the same direction by operating the electric motors 34a and 34b, the device advances straight along the wall surface 4. When the wheels 32a and 32b and the wheels 32c and 32d are rotated in an opposite direction by operating the electric motors 34a and 34b, the device moves while rotating about its axis and is directed in the desired direction.

In the first embodiment shown in FIGS. 1 to 4, means for creating a vacuum in the pressure reduction zone is not directly mounted on the pressure receiver member, but is attached to a track movable over the ground. Instead of this arrangement, such means may be directly provided in the pressure receiver member as shown in FIGS. 7 and 8.

Figure 7:
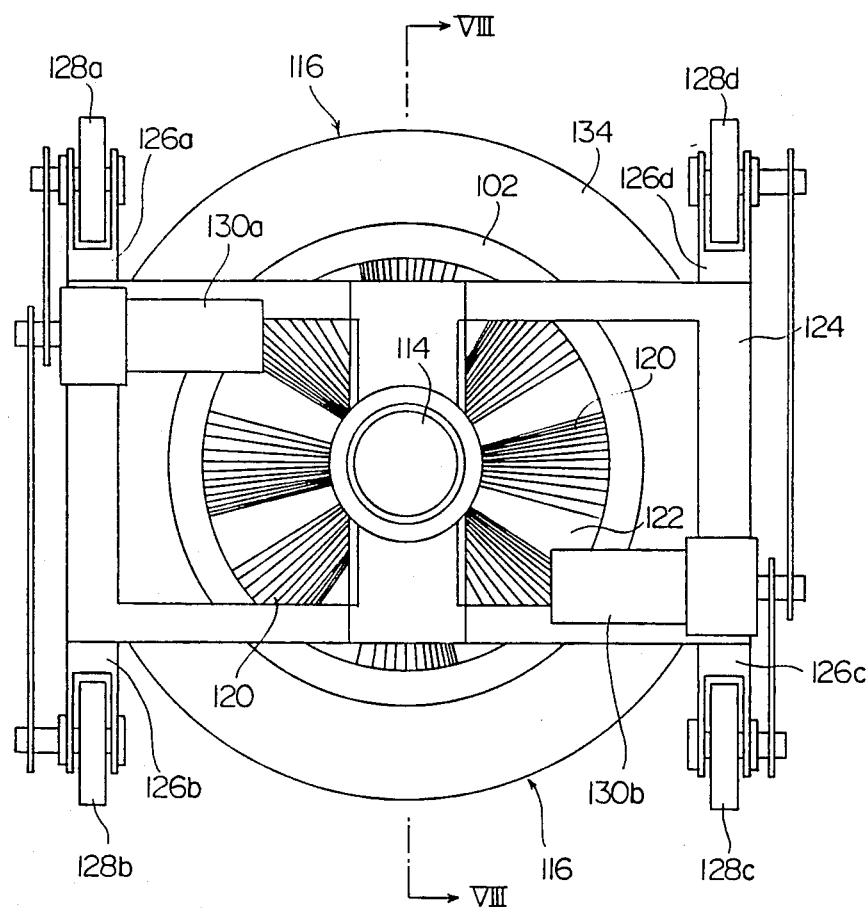
FIG. 7 is a top plan view of a second embodiment of the device constructed in accordance with this invention.
Figure 8:
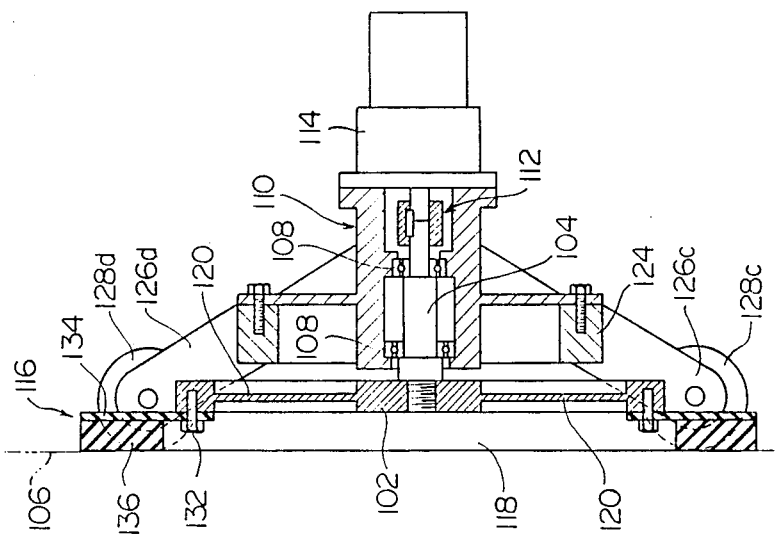
FIG. 8 is a sectional view taken along line VIII—VIII of FIG. 7.

FIGS. 7 and 8 shown a second embodiment of the device in accordance with this invention. The device in the second embodiment has a pressure receiver member 102 which can be formed of a rigid or semirigid material. In the second embodiment, too, the pressure receiver member 102 is nearly circular as a whole. One end portion of a shaft member 104 is threadedly secured to a central portion of the pressure receiver member 102, and the other end of the shaft member 104 extends outwardly from the outside surface of the pressure receiver member 102 (that surface which is opposite to the surface facing a wall surface 106) in a direction substantially perpendicular to the pressure receiver member 102. The shaft member 104 is rotatably supported on the main body 110 of the device through bearings 108, and its other end is drivingly connected to the output shaft of a driving source 114 such as an electric motor mounted on the main body 110 of the device via a connecting means 112. The bearings 108 used are those for thrust loads and for radial loads. Hence, when the driving source 114 is rotated, the pressure receiver member 102 is rotated via the shaft member 104 about the central axis of the shaft member 104, namely about an axis of rotation extending substantially perpendicularly to the wall surface 106.

In the second embodiment, means for creating a vacuum within a pressure reduction zone 118 defined by the pressure receiver member 102, a partition 116 attached to the pressure receiver member 102 and the wall surface 106 is mounted on the pressure receiver member 102. Such means is comprised of a plurality of vanes 120. More specifically, an annular opening is formed in the pressure receiver member 102, and the plurality of (eight in the illustrated embodiment) vanes 120 are disposed within the annular opening 122 at predetermined intervals. The vanes 120 may be detachably mounted on the pressure receiver member 102, or as shown in the illustrated embodiment, may be formed as an integral unit with the pressure receiver member 102. These vanes 120 may be of any shape which permits a fluid within the pressure reduction zone 118 to be discharged outside through the annular opening 122 when the pressure receiver member 102 is rotated by the driving source 114.

The remainder of the device in the second embodiment is of substantially the same structure as the first embodiment. Specifically, a rigid frame member 124 is fixed to the main body 110 of the device, and wheels 128a, 128b, 128c and 128d are rotatably mounted on four leg portions 126a, 126b, 126c and 126d of the frame member 124. Two electric motors 130a and 130b constituting a driving source for travelling are provided in the frame member 124. To the peripheral portion of the pressure receiver member 102 is connected by a suitable means such as a bolt 132 a partition 116 having substantially the same structure as the partition 42 illustrated in FIGS. 1 to 4 and 5-A. Alternatively, the partition 72 illustrated in FIG. 5-B or 6 may be used instead of the partition 116.

When the driving source 114 is operated in the second embodiment, the pressure receiver member 102 is rotated in a predetermined direction via the shaft member 104. As a result, the vanes 120 provided in the pressure receiver member 102 rotate as a unit with the pressure receiver member, and a fluid (for example, sea water when the device is used in the sea) within the pressure reduction zone 118 is discharged outside through the annular opening 122 to thereby create a vacuum within the pressure reduction zone 118 (in other words, to maintain the pressure reduction zone at a low pressure). Since the partition 116 has substantially the same structure as the first embodiment and is connected to the pressure receiver member 102, the fluid pressure acting on the pressure receiver member 102 owing to a difference in fluid pressure between the inside and outside of the pressure reduction zone 118 is transmitted to the wheels 128a, 128b, 128c and 128d through the shaft member 104, the bearings 108, the main body 110 of the device and the frame member 124, and further to the wall surface 106 via these wheels 128a to 128d to thereby cause the device to adhere to the wall surface 106 by suction. In the meanwhile, the fluid pressure acting on the partition 116, particularly an annular member 134, owing to a difference in fluid pressure between the inside and outside of the pressure reduction zone 118 biases the partition 116, that is the annular member 134 and an annular member 136, toward the wall surface 106. As a result, the annular member 136 is brought into contact with the wall surface 106. Furthermore, the partition 116 is rotated as a unit with the pressure receiver member 102, and the wall surface 106 is consequently cleaned.

Accordingly, the second embodiment also achieves the same result as the first embodiment. Furthermore, the device of the second embodiment can be made more simplified and reduced in size because the driving source 114 can be utilized not only to rotate the partition 116 (in other words, to cause it to act for treating the wall surface 106) but also to rotate the vanes 120 (in other words, to cause it to act for pressure reduction in the pressure reduction zone 118).

If desired, an ejector may be provided directly in the pressure receiver member instead of providing the vanes.

In the first and second embodiments described above, the pressure receiver member and the partition are moved with respect to the main body of the device. Instead of this construction, the device may also be constructed such that the partition is moved with respect to the pressure receiver member as shown, for example, in FIG. 9.

Figure 9:
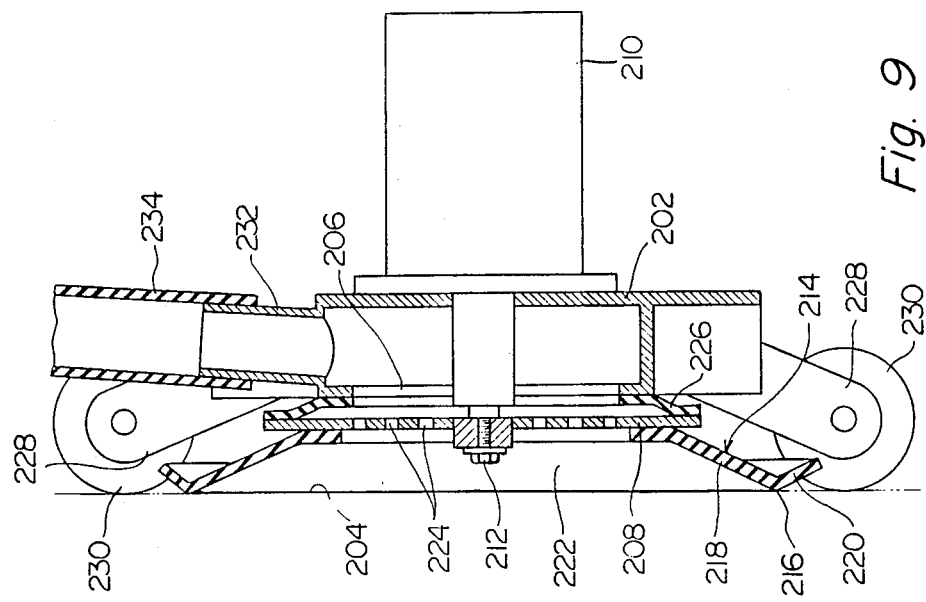
FIG. 9 is a sectional view showing a third embodiment of the device constructed in accordance with this invention.

FIG. 9 shows a third embodiment of this invention. The illustrated device includes a pressure receiver member 202 which may be formed of a rigid or semi-rigid material. In the third embodiment, the pressure receiver member 202 is of a nearly cylindrical box-like shape and is opened at that side which faces a wall surface 204.

A nearly circular rotating plate 208, which may be formed of, for example, a steel plate is disposed on that side of an opening 206 in the pressure receiver member 202 which faces the wall surface 204. A driving source 210 is mounted on the top wall of the pressure receiver member 202, and the output side of the driving source 210 extends through the pressure receiver member 202 and projects from the opening 206 toward the wall surface 204. To the projecting output end of the driving source 210 is fixed a central portion of the rotating plate 208 by a suitable means such as a bolt 212.

A partition 214 is attached to the peripheral edge portion of the rotating plate 208. The illustrated partition 214 is of substantially the same structure as the partition 72 shown in FIG. 5-B, and includes a main portion 218 extending outwardly toward the wall surface 204 from its one end connected to the rotating plate 208 by a suitable means such as a bolt and having a free end portion 216 to be contacted with the wall surface 204, and an extension 220 extending outwardly from the main portion 218 in a direction away from the wall surface 204. As can be clearly seen from FIG. 9, the partition 214 defines a pressure reduction zone 222 in cooperation with the pressure receiver member 202 and the wall surface 204. The rotating plate 208 has formed therein a plurality of holes 224 for communication between a first zone of the pressure reduction zone 222 defined by the rotating plate 208, the partition 214 and the wall surface 204 and a second zone of the pressure reduction zone 222 defined by the rotating plate 208 and the pressure receiver member 202. Instead of the partition 214, the partition shown in FIGS. 1 to 4 and 5-A and the partition shown in FIG. 6 may be used.

Preferably, an annular seal member 226 is provided between the pressure receiver member 202 and the rotating plate 208 as shown in FIG. 9. The seal member 226 is connected at one end portion to the periphery portion of the opening 206 of the pressure receiver member 202 by a suitable means, and extends outwardly from this end portion toward the rotating plate 208. The other end portion of the seal member 226 is thus kept in contact with the rotating plate 208. Desirably, the seal member 226 is formed of a non-permeable and flexible material such as a rubber. Because of the above-mentioned structure, when the driving source 210 is rotated, the rotating plate 208 and the partition 214 are rotated as a unit in a predetermined direction about the central axis of the output portion of the driving source 210, i.e. an axis of rotation extending substantially perpendicularly to the wall surface 204, with respect to the pressure receiver member 202 and the seal member 226.

The remainder of the device in the third embodiment has nearly the same structure as the first embodiment. Specifically, four leg portions 228 (only two of which are shown in FIG. 9) are fixed to the pressure receiver member 202, and wheels 230 (only two of which are shown in FIG. 9) are rotatably mounted on the leg portions 228. Two electric motors (not shown) constituting a travelling driving source are provided in the pressure receiver member 202. One electric motor rotates two wheels (the two wheels not shown in FIG. 9). A connecting part 232 is provided as an integral unit in the side wall of the pressure receiver member 202 so as to communicate with an evacuating means (not shown) such as a vacuum pump via a flexible hose 234.

When the evacuating means (not shown) is operated in the third embodiment, a fluid within the pressure reduction zone 222 is discharged outside through the connecting part 232 and the flexible hose 234 by the action of the evacuating means, and consequently, a vacuum is created within the pressure reduction zone 222. Since the partition 214 is of substantially the same structure as the partition shown in FIG. 5-B, the fluid pressure acting on the pressure receiver member 202 owing to a difference in fluid pressure between the inside and outside of the pressure reduction zone 222 is transmitted to the wheels 230 via the leg portions 228, and further to the wall surface 204 via the four wheels 230 to thereby cause the device to adhere to the wall surface 204 by suction. In the meanwhile, the fluid pressure acting on the partition 214 owing to a difference in fluid pressure between the inside and outside of the pressure reduction zone 222 biases the partition 214 toward the wall surface 204. As a result, the free end portion 216 of the main portion 218 of the partition 214 is brought into contact with the wall surface 204. Furthermore, the fluid pressure acting on the seal member owing to a difference in fluid pressure between the inside and outside of the pressure reduction zone 222 biases the seal member 226 toward the rotating plate 208 and brings the other end portion of the seal member 226 into contact with the rotating plate 208. As a result, a substantially fluid-tight seal is maintained between the pressure receiver member 202 and the rotating plate 208, and an outside fluid is surely prevented from flowing into the pressure reduction zone 222 through a space between the rotating plate 208 and the seal member 226.

When the driving source 210 is actuated while the device is adhering to the wall surface 204 in this manner, the partition 214 is rotated together with the rotating plate 208 in a predetermined direction to thereby clean the wall surface 204.

Accordingly, the third embodiment also achieves substantially the same operation and advantage as the first embodiment.

In the first to third embodiments, the partition is rotated about an axis of rotation substantially perpendicular to the wall surface. Because of this, the partition has a sealing function of defining the pressure reduction zone in cooperation with the pressure receiver member and the wall surface, and a treating function of performing a required treatment (such as cleaning) by being moved with respect to the pressure receiver member or the main body of the device. Thus, the devices do not separately require a treating means for treating the wall surface, and can be simplified and reduced in size as compared with the prior art devices.

In the following embodiments, the partition may be caused to have the sealing function and the travelling function, or a combination of the sealing function, the travelling function and the treating function, as will be described below. Incidentally, FIGS. 1 to 9 show the device as it adheres by suction to a substantially perpendicular wall surface, and FIGS. 10 to 15 show the device as it adheres by suction to a substantially horizontal wall surface.

Figure 10:
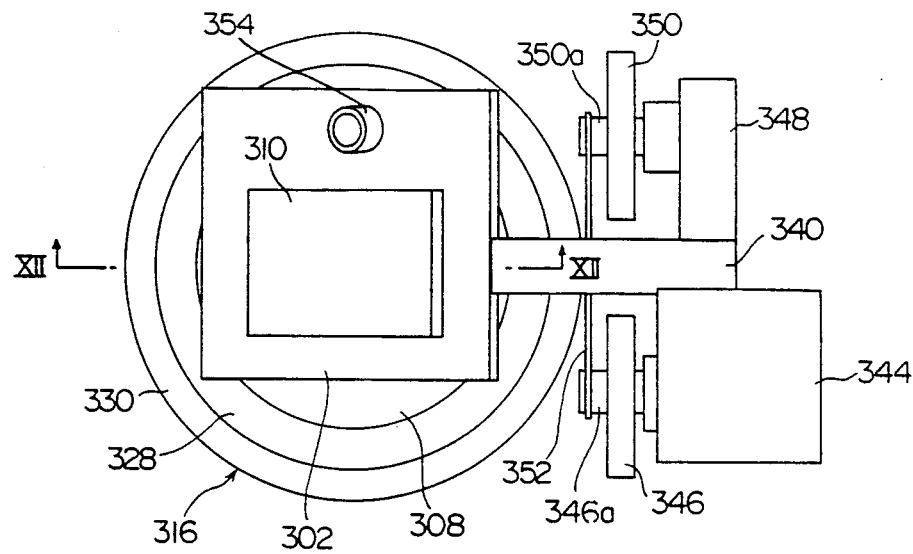
FIG. 10 is a top plan view showing a fourth embodiment of the device constructed in accordance with this invention.
Figure 11:
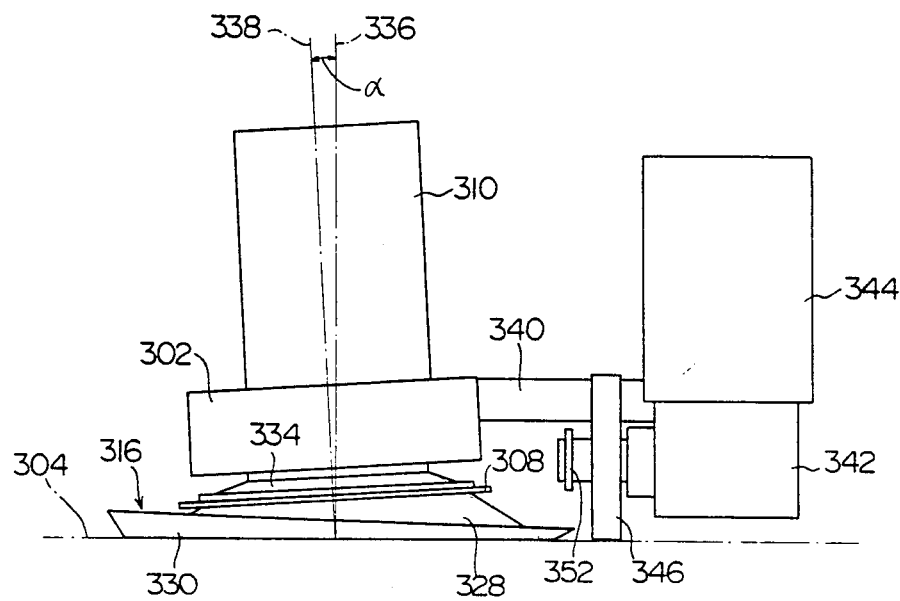
FIG. 11 is a side elevation of the device shown in FIG. 10.
Figure 12:
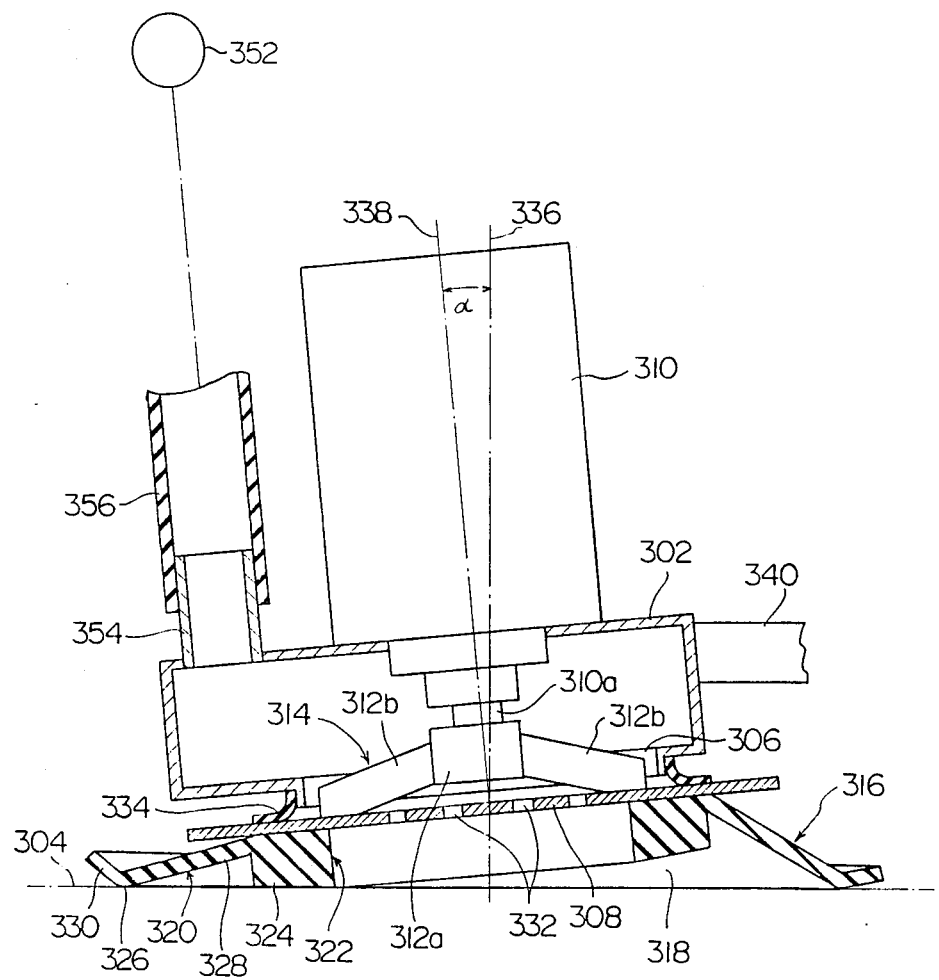
FIG. 12 is a sectional view taken along line XII—XII of FIG. 10.

FIGS. 10 to 12 show a fourth embodiment of the device constructed in accordance with this invention. The illustrated device includes a pressure receiver member 302 which can be formed of a rigid or semirigid material. In the fourth embodiment, the pressure receiver member 302 is of a nearly parallelpipedal boxlike shape, and a nearly circular opening 306 is formed on that side which faces a wall surface 304.

A nearly circular rotating plate 308 which can be formed of, for example, a steel plate is disposed on that side of the opening 306 of the pressure receiver member 302 which faces the wall surface 304 (i.e., on that side of the pressure receiver member 302 which faces the wall surface 304). A driving source 310 such as an electric motor capable of rotating in normal and reverse directions is mounted on the top wall of the pressure receiver member 302, and an output shaft 310a of the driving source 310 extends toward the wall surface 304. Over the rotating plate 308 is provided a connecting member 314 having a securing portion 312a and arm portions 312b extending radially from the securing portion 312b, and the arm portions 312b are fixed to the rotating plate 308. The securing portion 312a of the connecting member 314 is connected to the output shaft 310a of the driving source 310.

A partition 316 is disposed on the peripheral edge portion of the rotating plate 308. As can be seen from FIG. 12, the partition 316 defines a pressure reduction zone 318 in cooperation with the pressure receiver member 302 and the wall surface 304. As shown in the drawings, the partition 316 preferably has seal portion 320 disposed on the peripheral portion of the rotating plate 308 and defining the pressure reduction zone 318 in cooperation with the pressure receiver member 302 and the wall surface 304, and a supporting portion 322 disposed inwardly of the seal portion 320. Preferably, at least that part of the seal portion 320 which makes contact with the wall surface 304 is so constructed as to be able to be displaced toward and away from the wall surface 304 by a relatively small force with respect to the pressure receiver member 302. In the illustrated embodiment, the supporting portion 322 is formed of an annular member 324 and is fixed to that surface of the rotating plate 308 which faces the wall surface 304. The seal portion 320 comprises a main portion 328 extending from one end to the other end (free end) outwardly and toward the wall surface 304 and having a free end portion 326 to be contacted with the wall surface 304, and an extension 330 extending from the free end portion 326 of the main portion 328 outwardly and away from the wall surface 304, and the one end portion of the main portion 328 is connected to the top peripheral surface of the annular member 324. The one end portion of the main portion 328 may alternatively be directly connected to the peripheral edge portion of the rotating plate 308. The seal portion 320 preferably has flexibility, and the supporting portion 322 is preferably relatively rigid. In the illustrated embodiment, the seal portion 320 and the supporting portion 322 are formed of a polyurethane rubber into a one-piece unit. The seal portion 320 has a relatively small thickness, and the supporting portion 322 has a relatively large thickness. Alternatively, the seal portion may be formed of a flexible material, and the supporting member 322 is separately formed of a relatively rigid material such as hard rubber. The seal portion 320 of the partition 316 may have substantially the same structure as the partition shown in FIGS. 1 to 4 and 5-A. If desired, a blade may be attached to it as shown in FIG. 6.

The rotating plate 308 to which the partition 316 is attached has formed therein a plurality of holes 332 for communication between a first zone of the pressure reduction zone 318 defined by the rotating plate 308, the partition 316 (particularly the seal portion 320) and the wall surface 304 and a second zone of the pressure reduction zone 318 defined by the rotating plate 308 and the pressure receiver member 302. Preferably, an annular seal member 334 is disposed between the pressure receiver member 302 and the rotating plate 308 a shown in FIG. 12. In the illustrated embodiment, the seal member 334 is connected at one end portion to the peripheral surface of a flange portion 336 provided in the peripheral edge of the opening 306 of the pressure receiver member 302, and extends from the one end portion outwardly and toward the rotating plate 308. The other end portion of the seal member 334 is thus kept in contact with the rotating plate 308. Desirably, the seal member 334 is made of a non-permeable and flexible material such as rubber.

It is critical that the fourth embodiment is constructed such that the rotating plate 308, and therefore the partition 316, rotates about an axis 338 of rotation slightly inclined to an axis 336 substantially perpendicular to the wall surface 304. For this purpose, in the fourth embodiment, the central axis of the output shaft 310a of the driving source 310 is slightly inclined to the axis 336. Thus, when the driving source 338 is operated, the rotating plate 308 and the partition 316 rotate as a unit about the central axis of the output shaft 310a, i.e. the axis 338 of rotation slightly inclined to the axis 336, via the connecting member 314. The rotation of the partition 316 about the slightly inclined axis 338 of rotation makes the partition 316 function also as a travelling means as will be described in detail hereinbelow. The angle $\alpha$ formed between the axis 336 substantially perpendicular to the wall surface 304 and the central axis of the output shaft 310a of the driving source 310, i.e. the axis 338 of rotation of the partition 316 (in other words, the angle $\alpha$ of inclination of the axis 338 of rotation of the partition 316) is set at about 3 degrees in the illustrated embodiment.

A rigid frame member 340 is fixed to the pressure receiver member 302. The rigid frame member 340 extends from its one end portion fixed to the pressure receiver member 302 in a direction opposite to the inclined direction of the rotation axis 338 of the partition 316, and its other end portion is fixed to a deceleration means 342 (more specifically, a housing for the deceleration means 342). The input side of the deceleration means 342 is drivingly connected to an electric motor 344 rotatably in normal and reverse directions constituting a driving source and mounted on the housing of the deceleration means 342. The output side of the deceleration means 342 is drivingly connected to a wheel 346 rotatably mounted on the housing. The rigid frame 340 has a leg portion 348 on which a wheel 350 is rotatably mounted. Sprockets 346a and 350a are provided integrally in the wheels 346 and 350, and a roller chain 352 is wrapped between the sprockets 346a and 350a. Preferably, a material having a high coefficient of friction such as rubber is disposed on the peripheral surfaces of the wheels 346 and 350 in order to increase a frictional force between them and the wall surface 304. Thus, when the electric motor 344 is rotated, the wheel 346 is rotated via the deceleration means 342 and the wheel 350 is also rotated via the roller chain 352. To cause the device to travel in a required manner, at least one driving wheel is provided. Instead of the wheel, at least one driven endless track may be provided. It is possible also to connect an operating rod or the like to the pressure receiver member 302 and move the device in the desired direction by an operator operating the operating rod without the need to provide such a wheel or endless track in the pressure receiver member 302. As will be understood from the following description, it is preferred that the aforesaid pair of wheels 346 and 350 be disposed substantially parallel to the direction of a tangent to that site of the supporting portion 322 which makes contact with the wall surface 304.

The pressure reduction zone 318 defined by the pressure receiver member 302, the wall surface 304 and the partition 316 communicates with an evacuating means 352 (means for producing a vacuum within the pressure reduction zone 318) such as a vacuum pump. In the illustrated embodiment, a connecting portion 354 communicating with the pressure reduction zone 318 is provided on the top wall of the pressure receiver member 302, and one end portion of a flexible hose 356 is connected to the connecting portion 354. The other end portion of the flexible hose 356 communicates with the evacuating means 352.

Now, the operation and advantages of the device in the fourth embodiment will be described.

When the evacuating means 352 is operated, a fluid within the pressure reduction zone 318((for example, air when the device is used in the air) is discharged outside through the flexible hose 356 by the action of the evacuating means 352, and as a result, a vacuum is created within the pressure reduction zone 318. Since the seal portion 320 is flexible and relatively thin, the fluid pressure acting on the pressure receiver member 302 owing to a difference in fluid pressure between the inside and outside of the pressure reduction zone 318 is partly transmitted to the supporting portion 324 of the partition 316 via the driving source 310, the connecting member 314 and the rotating plate 308, and the remainder is transmitted to the wheels 346 and 350 via the frame member 340, the deceleration means 342 (specifically, its housing), etc. Finally, the above fluid pressure is transmitted to the wall surface 304 via the supporting portion 324 of the partition 316 and the wheels 346 and 350, and consequently, the device is caused to adhere to the wall surface 304 by suction. At this time, that site of the supporting portion 322 of the partition 316 which is substantially remotest from the wheels 346 and 350 is brought into contact with the wall surface 304 as clearly shown in FIGS. 11 and 12 since the rotation axis 338 of the partition 316 is slightly inclined toward that side which is opposite to the side of the wheels 346 and 350.

On the other hand, the fluid pressure acting on the seal portion 320 of the partition 316 owing to a difference in fluid pressure between the inside and outside of the pressure reduction zone 318 biases the seal portion 320 toward the wall surface 304 and thereby brings the free end portion 326 of the main portion 328 of the seal portion 320 into contact with the wall surface 302. The partition 316 is symmetrical, but is deformed as shown in FIGS. 11 and 12 as a result of the device adhering to the wall surface 304 by suction. The fluid pressure acting on the seal member 334 owing to a difference in fluid pressure between the inside and outside of the pressure reduction zone 318, as in the third embodiment, biases the seal member 334 toward the rotating plate 308 and thereby brings the other end portion of the seal member 334 into contact with the rotating plate 308.

When the driving source 310 is energized during the adherence of the device to the wall surface by suction, the partition 316 is rotated in a predetermined direction about the axis 338 of rotation slightly inclined to the axis 336 extending substantially perpendicularly to the wall surface 304 via the connecting member 314 and the rotating plate 308, and consequently, the wall surface 304 is cleaned. In the above suction-adhering state, a part of the supporting portion 322 and the seal portion 320 are kept in contact with the wall surface 304, and therefore, the wall surface is cleaned by the action of a part of the supporting portion 322 and the seal portion 320. Since the supporting portion 322 also functions as a travelling means as will be described below, it moves little relative to the wall surface 304, and therefore, the above cleaning is carried out mainly by the seal portion 320 of the partition 316. When the partition 316 is rotated as above, the partition 316, particularly its supporting portion 322, acts inclinedly to the wall surface (in other words, only a part of the annular part of the supporting portion 322 acts on the wall surface 304), and as a result, a force tending to move the device is generated between the supporting portion 322 and the wall surface 304. Hence, the device can be caused to travel in a required manner by the partition 316 rotated in this way and the wheels 346 and 350 driven by the electric motor 344. This will be further described with reference to FIGS. 13-A and 13-B. When the driving source 310 is rotated in a normal direction to rotate the partition 316, and therefore the supporting portion 322, in the direction of an arrow 358, the device tends to move in the direction shown by an arrow 360, i.e. in a direction tangentially opposite to the rotating direction at the site of contact between the supporting portion 322 and the wall surface 304. If at this time, the electric motor 344 is rotated in a normal direction to rotate the wheels 346 and 350 in the direction shown by an arrow 362 and the peripheral speed of the site of contact between the supporting portion 322 and the wall surface 304 is made substantially equal to the peripheral speed of the site of contact between the wheels 346 and 350 and the wall surface 304, the device moves straight in the direction of arrow 360. On the other hand, if the former peripheral speed differs from the latter peripheral speed (for example, if the former is larger than the latter) during the rotation of the driving source 310 and the electric motor in a normal direction, the supporting portion 322 advances ahead and the device moves while curving in the direction of an arrow 364 (opposite to the rotating direction of the supporting portion 322). If the former is smaller than the latter, the wheels 346 and 350 advance ahead, and the device moves while curving in the direction of an arrow 366 (the rotating direction of the supporting portion 322). When the wheels 346 and 350 are rotated in the direction of arrow 362 by rotating the electric motor 344 in a normal direction and in this state the driving source 310 is rotated in the reverse direction to rotate the partition 316 and therefore the supporting portion 322, in the direction shown by an arrow 368, the device pivots nearly about its central axis in the direction shown by an arrow 370 (the rotating direction of the supporting portion 322). During the rotation of the electric motor 344 in the reverse direction, the travelling direction of the device can be changed in the same way.

To obtain a large contact area between the supporting portion 322 and the wall surface 304, it is preferred that the shape of the under surface of the supporting portion 322 should be designed so as to be substantially parallel to the wall surface 304 at that site of the under surface which makes contact with the wall surface 304.

In the device according to the fourth embodiment described above, the partition 316 is rotated about the rotation axis 338 slightly inclined to the axis 336 which is substantially perpendicular to the wall surface 304. Because of this, the partition 316 has a sealing function of defining the pressure reduction zone 318 in cooperation with the pressure receiver member 302 and the wall surface 304, a treating function of treating the wall surface 304 as desired (for example, cleaning it) by being rotated relative to the pressure receiver member 302, and a travelling function of moving relative to the wall surface 304 by being rotated inclinedly to the wall surface 304. Accordingly, the device in this embodiment does not separately require means for treating the wall surface, and a travelling means for moving the device can partly be omitted. Hence, further simplification and size reduction can be achieved in the device movable along the wall surface.

The device shown in FIGS. 10 to 12 may be used by separately attaching treating means such as cleaning means and coating means, or inspection means.

Figure 14:
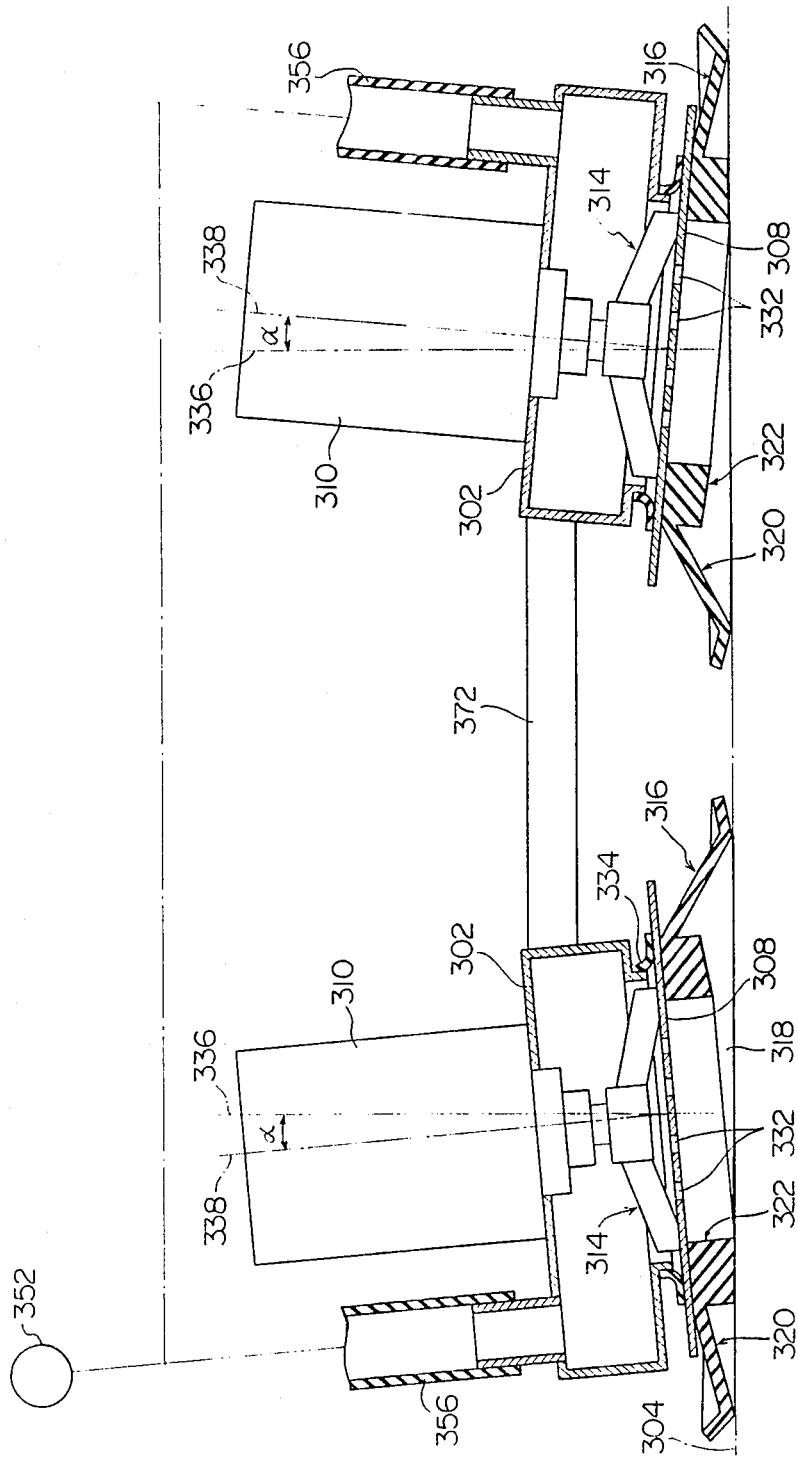
FIG. 14 is a sectional view showing a fifth embodiment of the device constructed in accordance with this invention.

FIG. 14 shows a fifth embodiment of the device in accordance with this invention. This embodiment consists of two units having the device (excepting the travelling means such as the wheels 346 and 350) of the fourth embodiment shown in FIGS. 10 to 12 which are connected to each other. For convenience of description, the same parts as shown in FIGS. 10 to 13 are designated by the same reference numerals in FIG. 14.

In FIG. 14, the illustrated device includes two units each having a pressure receiver member 302. A rotating plate 308 is disposed on the side of an opening 306 of each pressure receiver member 302 for rotation by the driving source 310. A partition is attached to each rotating plate 308. Thus, two separate pressure reduction zones 318 are defined by the individual pressure receiver members 302 and the partitions 316. The two pressure receiver members 302 are linked to each other by a frame 372. The pressure receiver member 302, the rotating plate 308 and the partition 316 in each unit are of substantially the same structures and functions as in the fourth embodiment illustrated in FIGS. 10 to 12, and a detailed description of these is omitted herein.

In the fifth embodiment, the supporting portion 322 of the partition 316 in one unit (the left one in FIG. 14) and the supporting portion 322 of the partition 316 in the other (the right one in FIG. 14) act as travelling means for the device. As a result, the device can be caused to travel in the desired manner without the need for particular travelling means such as wheels.

In the fifth embodiment, two units including the pressure receiver member and the partition are provided and connected to each other. This structure is not limitative, and if desired, three or more units including the pressure receiver member and the partition may be provided and be connected to each other via the frame. If further required, follower wheels or driving wheels may be provided in the frame or the pressure receiver members.

Figure 15:
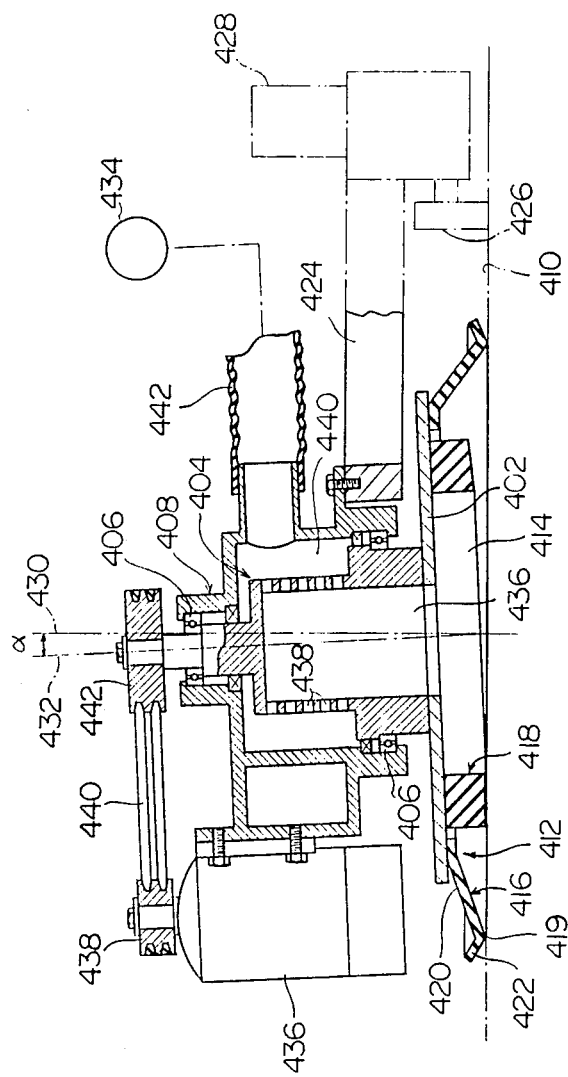
FIG. 15 is a sectional view showing a sixth embodiment of the device constructed in accordance with this invention.

FIG. 15 shows a sixth embodiment of the device in accordance with this invention. In the fourth embodiment shown in FIGS. 10 to 12, the partition is rotated about a slightly inclined axis of rotation with respect to the pressure receiver member. By contrast, in the sixth embodiment, the pressure receiver member and the partition connected to the pressure receiver member are rotated with respect to the main body of the device.

The device illustrated in FIG. 15 has a pressure receiver member 402 which can be formed of a rigid or semirigid material. A shaft member 404 is fixed to the pressure receiver member 402. The shaft member 404 is rotatably mounted on a main body 408 of the device via bearings 406. A partition 412 is provided on that surface of the pressure receiver member 402 which faces a wall surface 410. The partition 412 includes a seal portion 416 defining a pressure reduction zone 414 in cooperation with the pressure receiver member 402 and the wall surface 410 and a supporting portion 418 disposed inwardly of the seal portion 416. The seal portion 416 and the supporting portion 418 are separately formed. The seal portion 416 is formed of a relatively thin annular member formed of a flexible material. The seal portion 416 includes a main portion 420 extending from its one end portion connected to the pressure receiver member 402 outwardly and toward the wall surface 410 and having a free end portion 419 to be brought into contact with the wall surface 410, and an extension 422 extending outwardly from the free end portion 419 in a direction away from the wall surface 410. The supporting portion 418 is constructed of a relatively thick annular member made of a relatively rigid material and is fixed to the inside of the position of attaching the seal portion 416 of the pressure receiver member 402. Furthermore, one end of a rigid frame member 424 is fixed to the main body 408 of the device, and on the other end of the frame member 424 are rotatably mounted a pair of wheels 426 (only one of which is shown in FIG. 15) as in the fourth embodiment shown in FIGS. 10 to 12. The wheels 426 are rotated by the action of an electric motor 428.

It is critical that in the sixth embodiment, the pressure receiver member 402 and the partition 412 are rotated about an axis 432 of rotation slightly inclined to a an axis 430 which is substantially perpendicular to the wall surface 410. For this purpose, the central axis of the shaft member 404 fixed to the pressure receiver member 402 is slightly inclined to the axis 430, for example at an inclination angle of 3 degrees ($\alpha = 3°$).

The remainder of the device of the sixth embodiment has substantially the same structure as the first embodiment shown in FIGS. 1 to 4.

When an evacuation means 434 such as a vacuum pump is actuated in the device of the sixth embodiment, the fluid within the pressure reduction zone 414 is discharged outside via a hollow portion 436 of the shaft member 404, a plurality of holes 438 formed in the shaft member 404, an annular space 440 and a flexible hose 442 to thereby produce a vacuum within the pressure reduction zone 414. Since the seal portion 416 is adapted to be displaced, owing to the flexibility of its main portion 420, in a direction in which the free end portion 419 of the main portion 420 moves toward and away from the wall surface 410, the fluid pressure acting on the pressure receiver member 402 owing to a difference in fluid pressure between the inside and outside of the pressure reduction zone 414 is partly transmitted to the supporting portion 418 of the partition 412. The remainder is transmitted to the wheels 426 via the shaft member 404, the bearings 406, the main body 408 of the device and the frame member 424. Finally, the above fluid pressure is transmitted to the wall surface 410 via the supporting portion 418 of the partition 412 and the wheels 426 thereby to cause the device to adhere to the wall surface 410 by suction. On the other hand, the fluid pressure acting on the seal portion 416 of the partition 412 owing to a difference in fluid pressure between the inside and outside of the pressure reduction zone 414 biases the seal portion 416 toward the wall surface 410 and thereby brings the free end portion 419 of the main portion 420 of the seal portion 416 into contact wit the wall surface 410.

When the driving source 436 is energized during the suction-adhering of the device to the wall surface 410, the pressure receiver member 402 together with the partition 412 is rotated about the rotation axis 432 slightly inclined to the axis 430 via a sprocket 438, a roller chain 440, a sprocket 442 and the shaft member 404 thereby to clean the wall surface 410. When the partition 412, particularly its supporting portion 418, is so rotated, a force tending to move the device is generated between the wall surface 410 and that site of the supporting portion 418 which makes contact with the wall surface 410, as in the fourth embodiment. As a result, the device is caused to travel in a required manner along the wall surface 410 by the action of the supporting portion 418 of the partition 412 and the wheels 426 driven by the electric motor 428.

As described above, the partition 412 in the device of the sixth embodiment also has a sealing function, a treating function and a travelling function, and achieves substantially the same result as in the fourth embodiment.

The device of the sixth embodiment may also be used by separately attaching treating means such as cleaning means and coating means, or inspection means.

It will be readily understood that the devices of the first to sixth embodiments can be used not only in gases such as atmospheric air but also in liquids such as water and sea water. These devices can be conveniently used for cleaning the outside wall surface of a ship, the outside wall surface of an oil reservoir tank, the outside wall surface of a tall building, the inside wall surface of a core pool of a nuclear reactor, etc.

While the invention has been described hereinabove with reference to the various embodiments illustrated in the accompanying drawings, it should be understood that the invention is not limited to these specific embodiments, and various changes and modifications are possible without departing from the scope of the invention described and claimed herein.

For example, in the above embodiments, the partition is made of a rubbery material, and the invention has been described with reference to application of the device to the cleaning of a wall surface. For cleaning purposes, the partition may also be made of a woven or nonwoven fabric. Furthermore, by forming the partition from a rubber containing abrasive grains, the device of this invention can be applied to the polishing or grinding of a wall surface. Alternatively, by making the partition from a liquid-impregnable material such as a sponge rubber, the device of the invention can also be applied to the coating of a liquid such as a glossing agent on a wall surface.

What is claimed is:

1. A device capable of adhering to a wall surface by suction by the pressure of an ambient fluid and treating the wall surface, said device comprising
    means for treating the wall surface;
    a pressure receiver member;
    a partition provided on the pressure receiver member and facing toward the wall surface, the partition being rotatable with respect to the pressure receiver member about an axis of rotation,
    said device maintaining said axis of rotation slightly inclined to an axis which is perpendicular to the wall surface, said partition having apart which is adapted to make contact with the wall surface to define a pressure reduction zone in cooperation with the pressure receiver member and the wall surface;
    means for creating a vacuum within the pressure reduction zone by discharging fluid from the pressure reduction zone;
    a driving source mounted on the pressure receiver member for rotating the partition with respect to the pressure receiver member;
    said driving source and partition, due to said slightly inclined axis of rotation, constituting means for moving the device along the wall surface by generating a force between the wall surface and the rotating inclined partition; wherein the device is caused to adhere to the wall surface by suction due to a difference in fluid pressure between the inside and outside of the pressure reduction zone, and the device is moved by rotating the partition by the driving source.

2. The device of claim 1 wherein the partition comprises at least a portion of the means for treating the wall surface.

3. The device of claim 1 wherein at least one wall contacting member adapted to make contact with the wall surface is provided on the pressure receiver member.

4. The device of claim 3 member having means for driving the wall contacting member, whereby the wall contacting member, in cooperation with the partition rotated by the driving source, causes the device to travel.

5. The device of claim 3 wherein a rotating plate adapted to rotate by the driving source about said axis of rotation is provided on the pressure receiver member and faces the wall surface; one end portion of the partition is connected to the rotating plate; and the rotating plate has formed therein an opening for communication between a first zone defined by the rotating plate, the partition and the wall surface and a second zone defined by the rotating plate and the pressure receiver member.

6. The device of claim 5 wherein the partition comprises a seal portion disposed on the peripheral edge portion of the rotating plate and defining the pressure reduction zone in cooperation with the pressure receiver member and the wall surface and a supporting portion disposed inwardly of the seal portion; the seal portion of the partition having a sealing surface which makes contact with the wall surface and can be displaced with respect to the rotating plate by a relatively small force; said sealing surface of the seal portion being brought into contact with the wall surface by the fluid pressure acting on the seal portion due to a difference in fluid pressure between the inside and outside of the pressure reduction zone; and meanwhile, the fluid pressure acting on the pressure receiver member due to a difference in fluid pressure between the inside and outside of the pressure reduction zone is transmitted to the wall surface via the supporting portion of the partition and the wall contacting member, whereby the device is caused to adhere to the wall surface by suction.

7. The device of claim 6 wherein the supporting portion of the partition is constructed of an annular member fixed to that surface of the rotating plate which faces the wall surface; the seal portion comprises a main portion extending from one end connected to the peripheral surface of the upper part of the annular member outwardly and toward the wall surface and having a free end portion to be contacted with the wall surface, and an extension extending further outwardly from the free end portion of the main portion in a direction away from the wall surface; the free end portion of the seal portion is brought into contact with the wall surface by the fluid pressure acting on the seal portion owing to a difference in fluid pressure between the inside and outside of the pressure reduction zone; meanwhile, the fluid pressure acting on the pressure receiver member owing to a difference in fluid pressure between the inside and outside of the pressure reduction zone is transmitted to the wall surface via the annular member and the wall contacting member, whereby the device is caused to adhere to the wall surface by suction; and by the flexibility of the main portion itself of the seal portion, the free end portion of the main portion is displaced toward and away from the wall surface by a relatively small force.

8. The device of claim 5 which comprises an annular seal member disposed between the pressure receiver member and the rotating plate, said seal member extending from its one end connected to the pressure receiver member outwardly and toward the rotating plate and terminating at the other end kept in contact with the rotating plate.

9. The device of claim 1 wherein a blade is attached to the partition for removing solid matter adhering to the wall surface.

10. The device of claim 1 wherein the vacuum creating means is connected to the pressure reduction zone via a flexible hose.

11. The device of claim 1 which comprises at least two units each having the pressure receiver member and the partition and defining two or more separate pressure reduction zones, said two or more units being individually connected to a frame.

12. A device capable of adhering to a wall surface by suction by the pressure of an ambient fluid and treating the wall surface, said device comprising means for treating the wall surface;
a main body,
a pressure receiver member mounted on the main body for free movement about an axis of rotation, said device maintaining said axis of rotation slightly inclined to an axis perpendicular to the wall surface,
a partition provided on the pressure receiver member and facing toward the wall surface, one end portion of the partition being connected to the pressure receiver member, and a part of the partition being adapted to make contact with the wall surface to define a pressure reduction zone in cooperation with the pressure receiver member and the wall surface,
means for creating a vacuum within the pressure reduction zone by discharging the fluid from the pressure reduction zone, and
a driving source mounted on the main body for rotating the pressure receiver member with respect to the main body;
said driving source and partition, due to said slightly inclined axis of rotation, constituting means for moving the device along the wall surface by generating a force between the wall surface and the rotating inclined partition; wherein the device is caused to adhere by suction to the wall surface owing to a difference in fluid pressure between the inside and outside of the pressure reduction zone, and the device is moved by rotating the partition by the driving source.

13. The device of claim 12 wherein the partition comprises at least a portion of the means for treating the wall surface.

14. The device of claim 12 wherein at least one wall contacting member adapted to make contact with the wall surface is provided on the main body.

15. The device of claim 14 having means for driving the wall contacting member, whereby the wall contacting member, in cooperation with the partition rotated by the driving source, causes the device to travel.

16. The device of claim 14 wherein the partition comprises a seal portion disposed on the peripheral edge portion of the pressure receiver member and defining the pressure reduction zone in cooperation with the pressure receiver member and the wall surface and a supporting portion disposed inwardly of the seal portion; the seal portion of the partition having a sealing surface which makes contact with the wall surface and can be displaced with respect to the pressure receiver member by a relatively small force; said sealing surface of the seal portion is held in contact with the wall surface by the fluid pressure acting on the seal portion owing to a difference in fluid pressure between the inside and outside of the pressure reduction zone; and meanwhile, the fluid pressure acting on the pressure receiver member owing to a difference in fluid pressure between the inside and outside of the pressure reduction zone is transmitted to the wall surface via the supporting portion of the partition and the wall contacting member, whereby the device is caused to adhere to the wall surface by suction.

17. The device of claim 16 wherein the supporting portion of the partition is constructed of an annular member fixed to the pressure receiver member and facing toward the wall surface; the seal portion comprises a main portion extending from one end connected to the peripheral surface of the upper part of the annular member outwardly and toward the wall surface and having a free end portion to be contacted with the wall surface, and an extension extending further outwardly from the free end portion of the main portion in a direction away from the wall surface; the free end portion of the seal portion being held in contact with the wall surface by the fluid pressure acting on the seal portion owing to a difference in fluid pressure between the inside and outside of the pressure reduction zone; meanwhile, the fluid pressure acting on the pressure receiver member owing to a difference in fluid pressure between the inside and outside of the pressure reduction zone is transmitted to the wall surface via the annular member and the wall contacting member, whereby the device is caused to adhere to the wall surface by suction; and by the flexibility of the main portion itself of the seal portion, the free end portion of the main portion is displaced toward and away from the wall surface by a relatively small force.

* * * * *